(12) United States Patent
Walkowski

(10) Patent No.: US 7,163,037 B2
(45) Date of Patent: Jan. 16, 2007

(54) GUIDING MOVEMENT OF CAPLESS FILLER NECK CLOSURE

(75) Inventor: Paul D. Walkowski, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 191 days.

(21) Appl. No.: 11/041,055

(22) Filed: Jan. 21, 2005

(65) Prior Publication Data

US 2006/0162813 A1  Jul. 27, 2006

(51) Int. Cl.
*B65B 1/04* (2006.01)
(52) U.S. Cl. ............... 141/350; 220/86.2; 220/DIG. 33
(58) Field of Classification Search ................ 141/301, 141/312, 348–350; 220/86.2, DIG. 33; 137/587, 137/590
See application file for complete search history.

(56) References Cited

U.S. PATENT DOCUMENTS 4,526,216 A * 7/1985 Lake, Jr. ..................... 141/348
5,921,297 A   7/1999 Kremer
6,009,920 A   1/2000 Palvoelgyi
6,029,719 A * 2/2000 Hor et al. ................... 141/348
6,155,316 A   12/2000 Benjey
RE37,776 E   7/2002 Foltz
6,691,750 B1  2/2004 Foltz
6,880,594 B1 * 4/2005 Benjey ....................... 141/350
7,096,899 B1 * 8/2006 Vetter et al. ................ 141/350

FOREIGN PATENT DOCUMENTS

FR   2 753 138 A   3/1998
WO   WO 98/34833 A  8/1998

OTHER PUBLICATIONS

PCT Search Report, PCT/IB2006/000092 search completed Apr. 25, 2006.

* cited by examiner

*Primary Examiner*—Timothy L. Maust
(74) *Attorney, Agent, or Firm*—Anna M. Shih; Roger A. Johnston

(57) ABSTRACT

A capless filler tube closure door has a pair of spaced axles or pins which are guided by slots to initially upon being opened by a refueling nozzle move in translation away from the nozzle orifice seat and then pivot out of the way so as not to obstruct the nozzle. Upon nozzle removal as the door approaches the seat, it moves in linear translation to close on the seat to ensure uniform sealing.

20 Claims, 5 Drawing Sheets

GUIDING MOVEMENT OF CAPLESS FILLER NECK CLOSURE

BACKGROUND OF THE INVENTION

The present invention relates to filler tubes for fuel tanks for motor vehicles and more particularly to the closure for the refueling nozzle receiving end of the filler tube or neck as it is commonly referred to.

Recent mandated requirements for limiting fuel vapor emission to the atmosphere from motor vehicle fuel tanks and fuel supply systems have required an on-board diagnostic system which monitors the integrity of the fuel system at selected intervals during operation to determine if vapor leaks are present in the system. Typically, such on-board diagnostics utilize electrically controlled valves in the vapor vent lines to permit the engine air inlet or induction system to draw a slight vacuum in the system and measure the leak rate of the system as a function of the change in the vacuum over a selected time interval. Alternatively a slight positive or gage pressure may be employed to detect leakage. Currently, production motor vehicles are equipped with an on-board diagnostic system which performs such vacuum or pressure leak tests periodically during operation of the vehicle automatically without any knowledge of the vehicle operator. However, if a fault is detected in the system, an indicator for the operator is energized.

In systems employing a vacuum for leak testing, in order for such on-board diagnostic systems to be effective in drawing a vacuum in the fuel system including the tank, the filler cap on the tank filler neck must be adequately sealed in order to create the vacuum in the tank. Inasmuch as fuel tank filler caps are removed and repositioned many times by the vehicle operator over the service life of the vehicle, the filler cap has proven to be a source of trouble and often leakage due to wear or improper positioning by the vehicle operator; and, thus the on-board diagnostic system will indicate a fault in the integrity of the vapor containment in the fuel system. Thus, it has been desired to eliminate the filler cap for the fuel tank filler neck and to provide a way or means for permitting the vehicle operator to engage a refueling discharge nozzle with the filler neck and to provide for automatic closure and sealing of the filler neck upon removal of the nozzle without utilizing a removable filler cap.

Providing an automatic capless sealing closure for a fuel tank filler neck has proven to be a real challenge inasmuch as the closure must withstand not only the inertial loads imposed by vehicle bounce and jounce, but must also maintain the integrity of the filler neck closure seal in the event of a collision and/or vehicle rollover.

Thus, it has long been desired to provide a capless closure for a vehicle fuel tank filler neck which provides for a positive seal which can be maintained during the on-board diagnostic vacuum or pressure leak test and which can be latched to ensure that the closure and seal are maintained during collision and/or rollover in a manner which is easy to install on the vehicle, user friendly for refueling operations and which is low in cost to facilitate use of the mechanism or device in high volume production.

BRIEF SUMMARY OF THE INVENTION

The present invention provides a capless filler neck of the type having a nozzle-receiving aperture provided in a bulkhead on the end of the filler neck. The invention employs a closure or door with a resilient seal and is biased to seat about the nozzle aperture on the downstream side of the bulkhead. The closure or door is moveably disposed on a support structure which may be attached as a sub-assembly to the downstream side of the bulkhead and which permits the closure or door, upon operator insertion of a refueling nozzle through the aperture, to be moved a short distance in translation to remove the door seal from the seat. Upon further insertion of the nozzle, movement of the closure is guided, by engagement of following surfaces provided on the door with a set of guide surfaces on the support structure, to move pivotally out of the way to a position substantially not obstructing the aperture and permitting full insertion of the nozzle. The guide surfaces on the support structure in one embodiment comprise a pair of spaced tracks in the form of slots; and, the following surfaces on the door comprise a pair of trunnion pins or axles. Upon removal of the nozzle, the door is biased to reverse the sequence of movement and permits the seal to move against the nozzle aperture on the downstream side of the bulkhead during translation movement of the door to thereby facilitate a positive seal between the door and the aperture and eliminate scrubbing of the seal which would otherwise occur if the door were simply hinged.

DETAILED DESCRIPTION OF THE INVENTION

Figure 1:
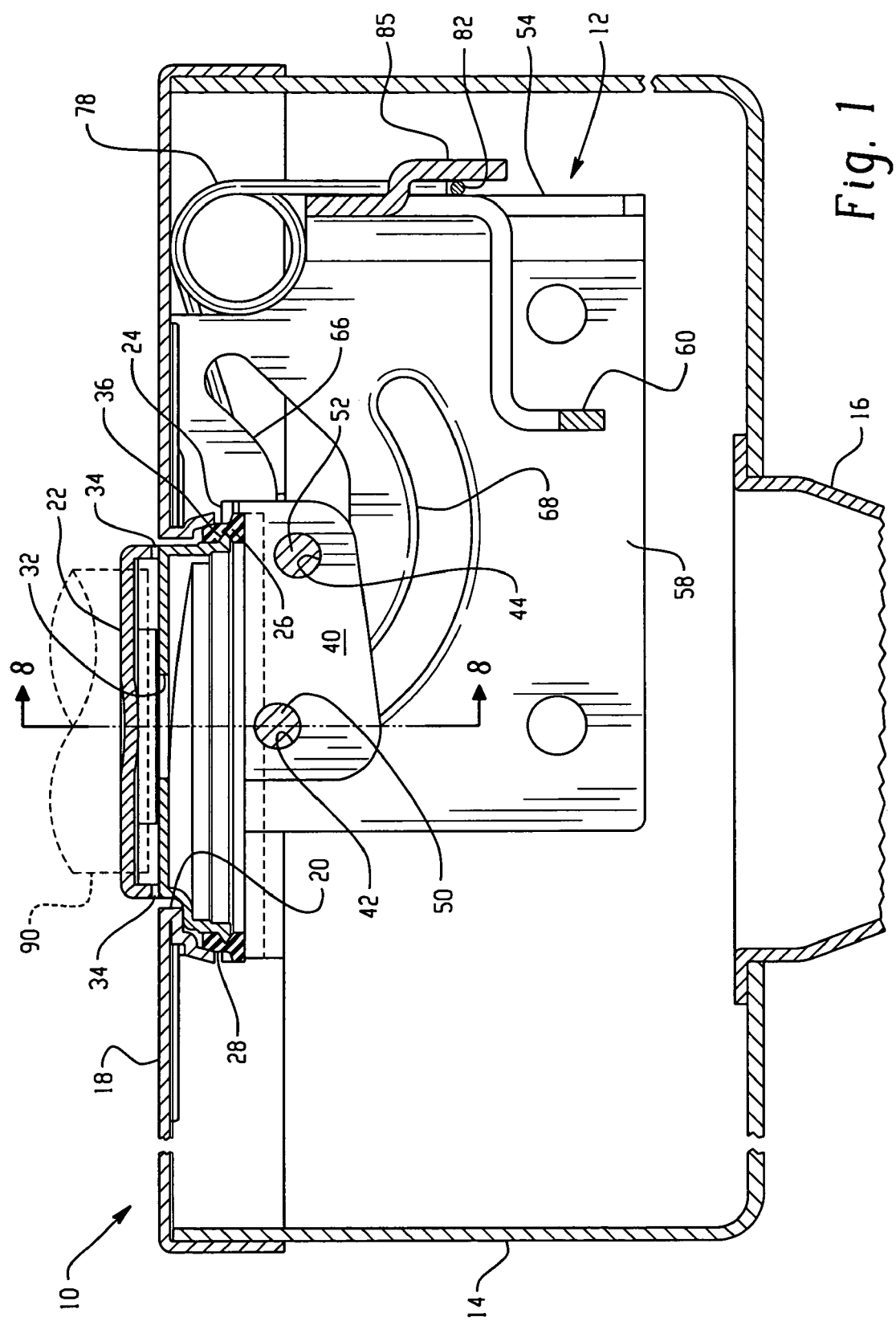
FIG. 1 is a cross-section of the invention installed in the upper end of a fuel tank filler tube.
Figure 2:
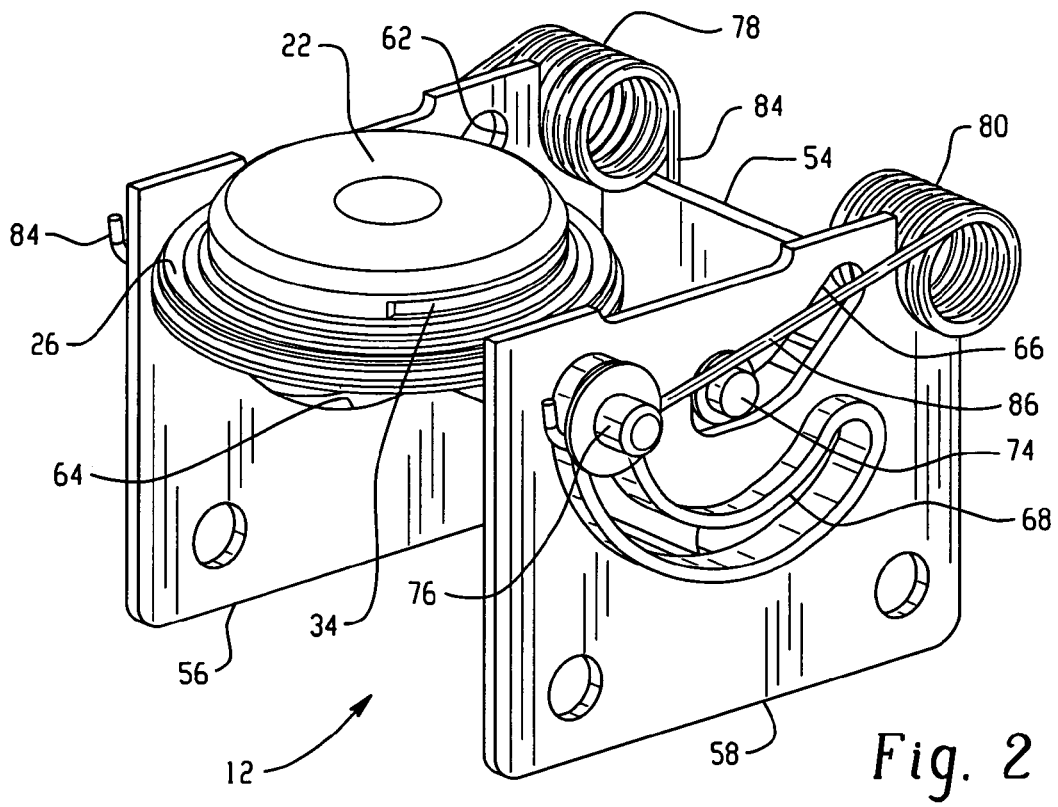
FIG. 2 is an axonometric view of the closure and support mechanism subassembly of the embodiment of FIG. 1 shown in the closed position.
Figure 3:
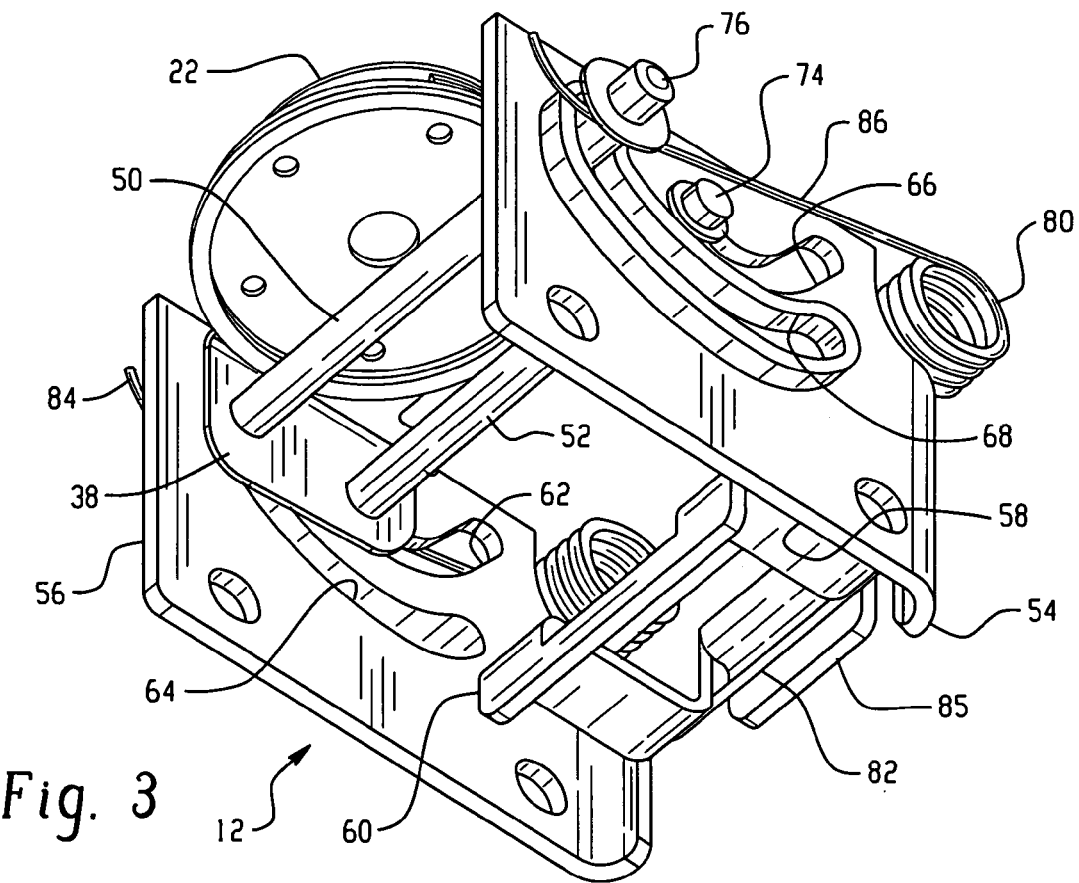
FIG. 3 is an axonometric view of FIG. 2 from below.
Figure 4:
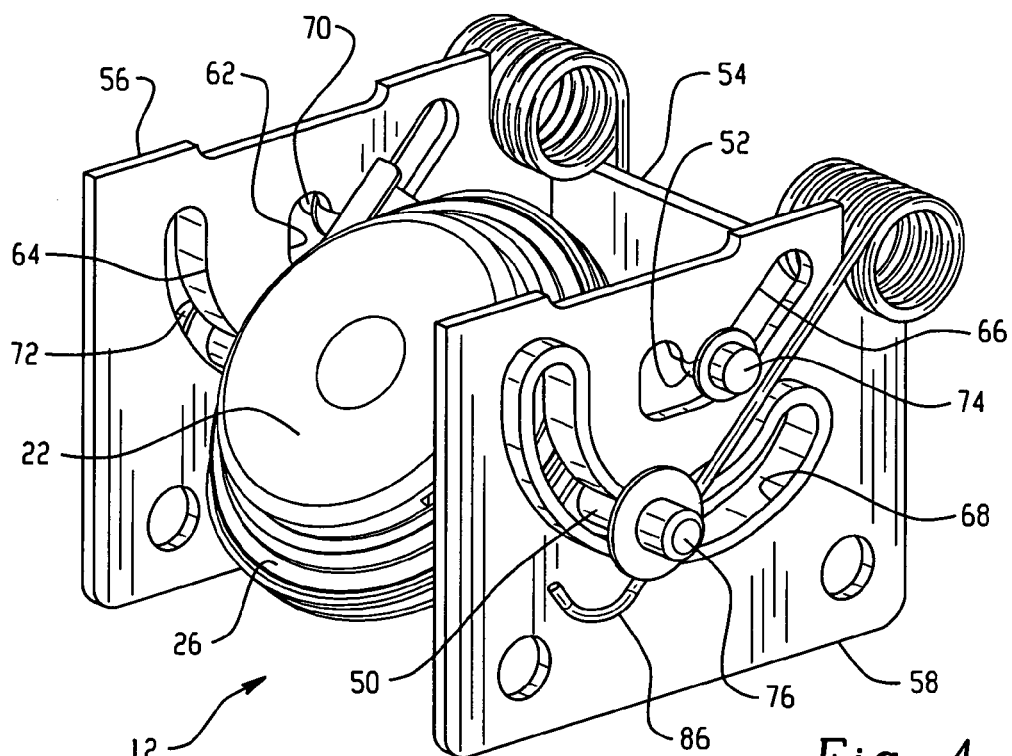
FIG. 4 is a view similar to FIG. 2 showing the mechanism in the partially opened position.
Figure 5:
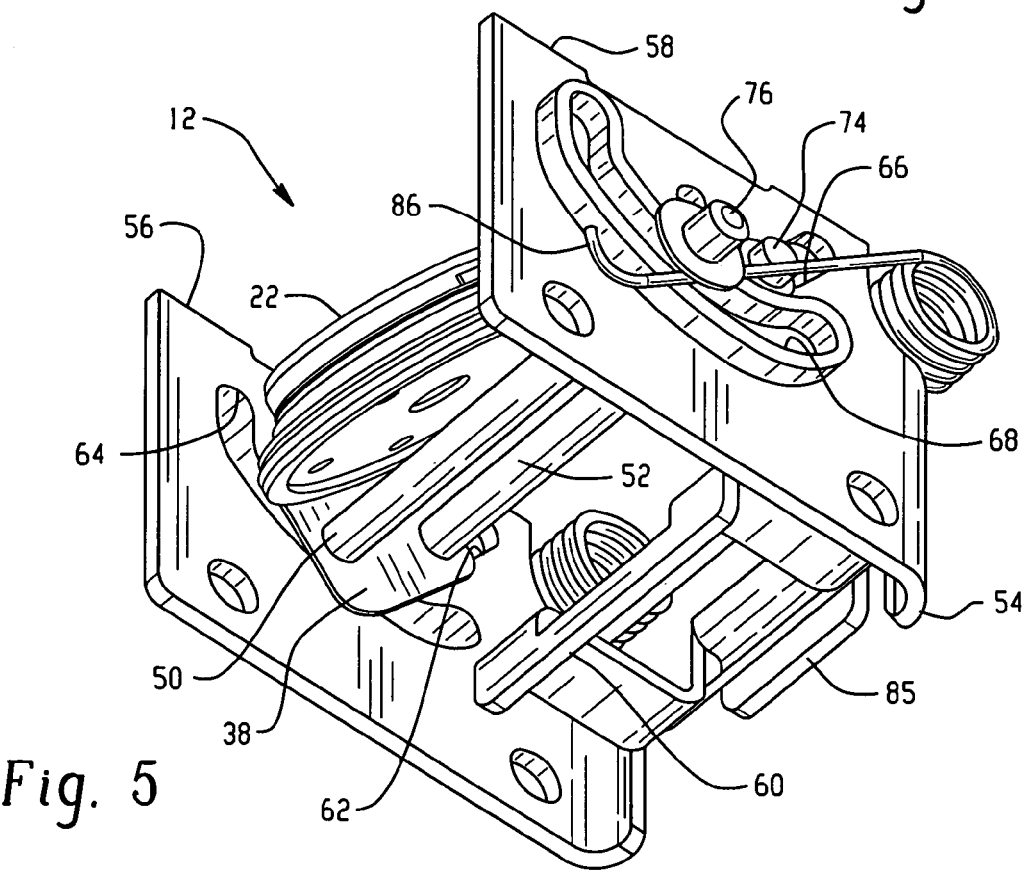
FIG. 5 is a view of FIG. 4 from below.
Figure 6:
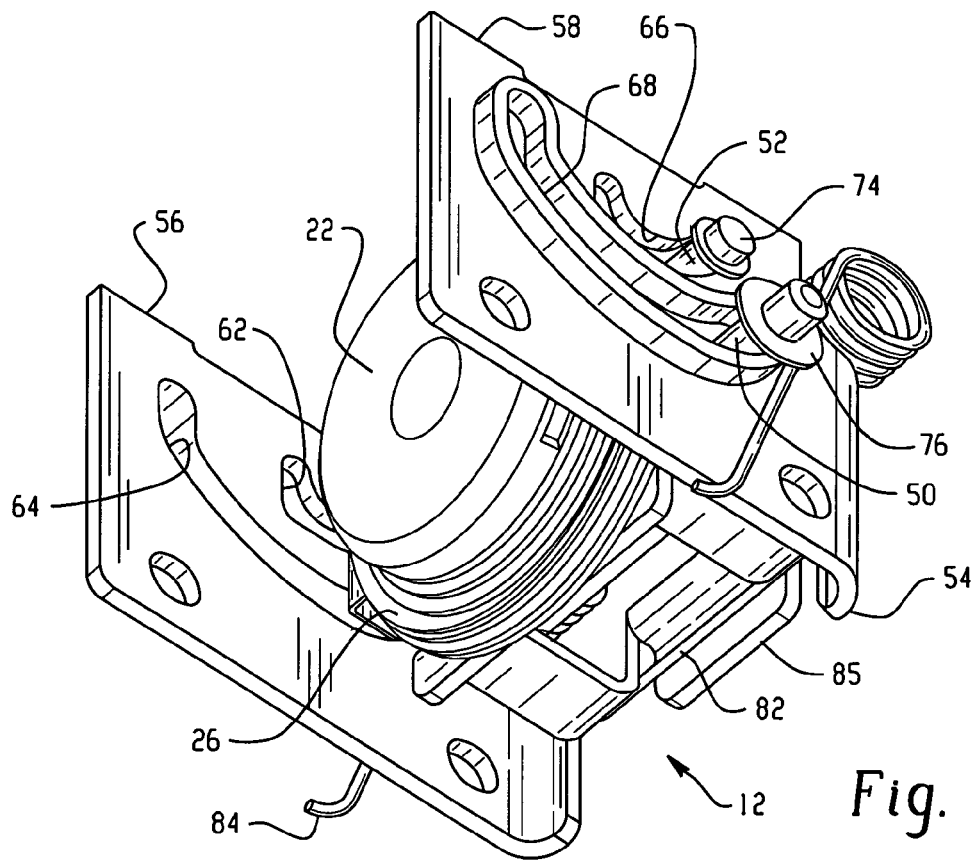
FIG. 6 is an axonometric view from below of the subassembly of FIG. 4 in the fully open position.
Figure 7:
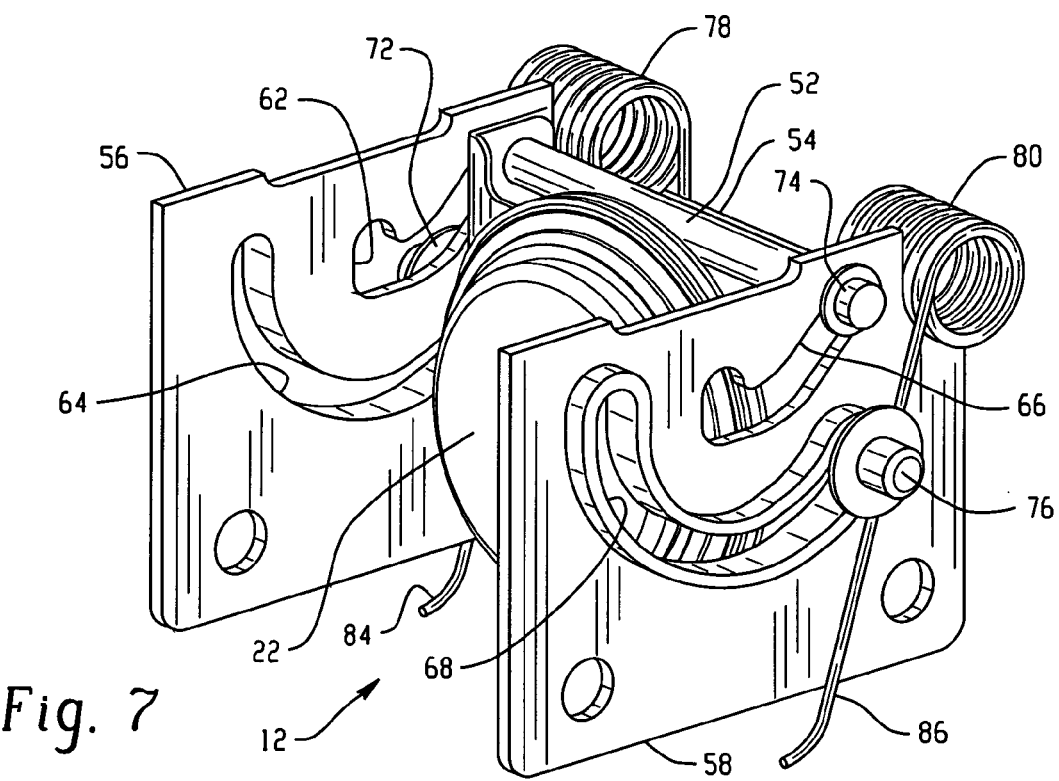
FIG. 7 is an axonometric view from above of the device in the position of FIG. 6; and, FIG. 8 is a cross-section taken along section-indicating lines 8—8 of FIG. 1.
Figure 8:
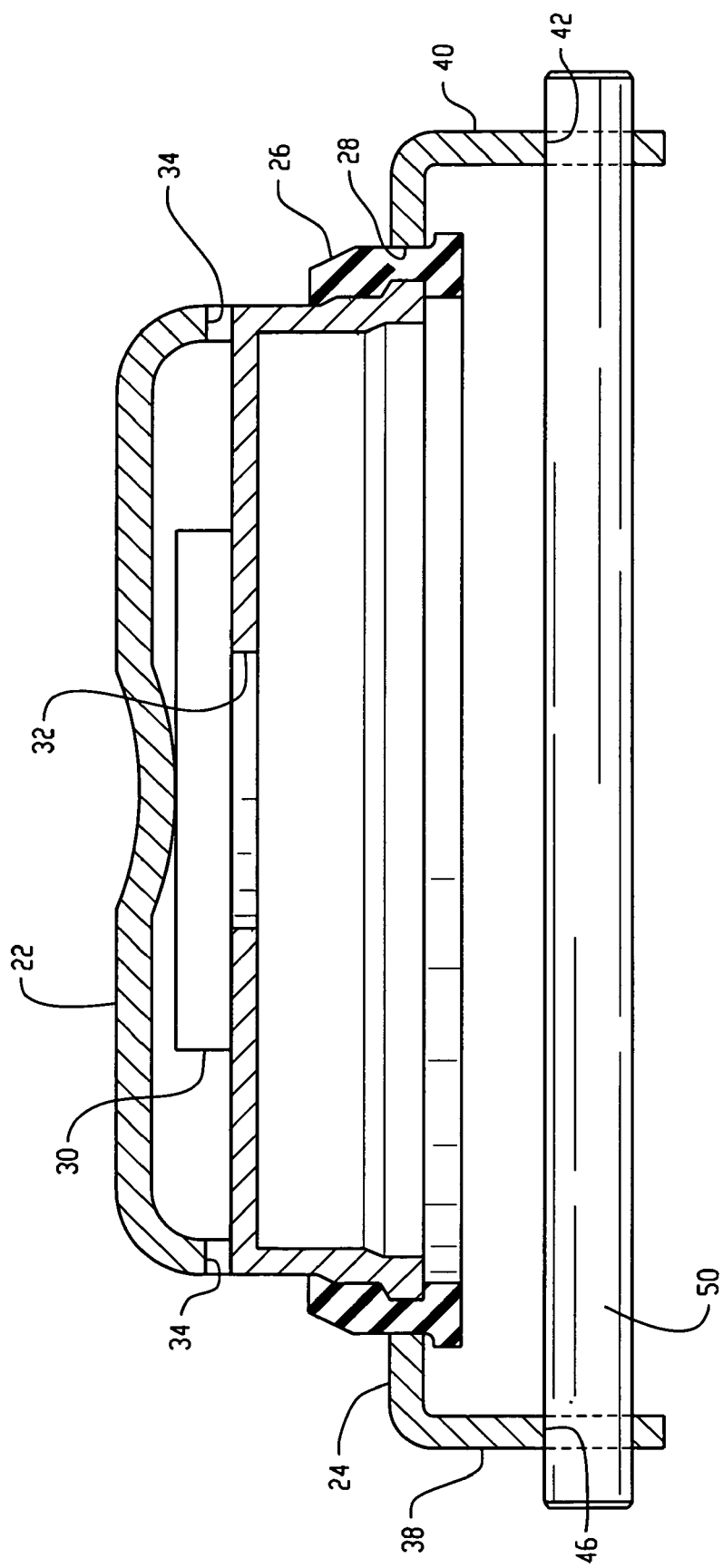

Referring to FIG. 1, a fuel tank filler tube assembly embodying the present invention is indicated generally at 10 wherein a capless closure and support structure are indicated as a subassembly generally at 12 as received in a filler cup 14 attached to the upper end of the filler tube or neck 16. The filler cup 14 has a bulkhead 18 secured and sealed over the open end thereof, which bulkhead has a nozzle-receiving aperture 20 formed therein.

In the illustrated exemplary embodiment a closure door 22 is shown with a radially outwardly extending peripheral flange 24 formed thereon which has a plurality of apertures 28 therethrough which may be spaced circumferentially thereabout. A flexible annular seal 26 is disposed about the flange and secured thereto; as, for example, by insert molding the seal 26 thereon with portions of the molded seal material passing through the apertures 28. The door 22 may include a one-way pressure relief valve (not shown) which opens to permit flow through central orifice 32 and peripheral slots 34.

The nozzle-receiving orifice 20 has formed thereabout an annular seating surface 36 which may have a spherical configuration, if desired.

Peripheral flange 24 has formed thereon two oppositely disposed downwardly extending brackets 38, 40, each of which has spaced apertures denoted respectively 42, 44 and 46, 48 which are aligned in pairs so as to have received therethrough pins or axles 50, 52 which extend outwardly of the brackets 38, 40.

Referring to FIGS. 1 through 7, a support structure or housing 54 is disposed on the downstream or undersurface of bulkhead 18; and, housing 54 may have a generally U-shaped configuration with the legs or sidewalls denoted 56, 58 thereof disposed in spaced generally parallel arrangement and may be formed integrally as a one-piece member. In the exemplary embodiment shown in the drawings, housing 54 has, on the closed end of the U-shape thereof, a tab or projection 60 which serves as a limit stop for movement of the door 22 as will hereinafter be described.

The sidewalls 56, 58 each have a pair or set of spaced guide surfaces denoted respectively 62, 64 and 66, 68. In the exemplary embodiment illustrated in the drawings, the guide surfaces comprise pairs of slots configured to provide the desired movement of the door 22 when the ends of pins 50, 52 are received in contact with the guide surfaces such as the slots. It will be understood that although slots are shown in the illustrated embodiment, alternatively, guide tracks similarly configured may be used. In the presently illustrated embodiment, the ends of the pins 50, 52 act as followers or trunnions to be guided by the slots 62, 64, and 66, 68. The pins may be retained in any suitable manner, as for example, be end caps pressed thereon as denoted by reference numerals 70, 72 and 74, 76, and which caps may have a hat-shaped configuration for retaining the pins axially.

A torsion spring having spaced coils 78, 80 has one end of each interconnected in a U-shaped portion 82 (see FIGS. 1, 5, 6 and 8) which is retained on the housing by a suitable tab 85 which may be integrally formed therewith. The opposite ends of the coils 78, 80 extend outwardly of the coils and over the sidewalls 56, 58, as denoted by reference numerals 84, 86, and bear against the undersurface of pin 50 to provide a spring bias in a direction to close the door 22 against the seating surface 36.

In operation, when the end of a refueling nozzle show in dashed outline and denoted by reference numeral 90 is placed in contact with the upper surface or door 22, and pushed downwardly by the operator to enter the aperture 20, the door 22 initially undergoes movement in translation to the position shown in dashed outline in FIG. 1. The pins 50, 52 thus move in the vertically oriented left end portion of the slots 62, 64 and 66, 68. As the nozzle is further inserted into the aperture 20, the door 22 is moved downwardly; and, the followers 50, 52 enter into a curved portion of slots 62, 64 and 66, 68 which causes the door to rotate to the position shown in FIGS. 4 and 5. Further insertion of a refueling nozzle causes the followers 50, 52 to move in the guide surfaces or slots until the door is vertically positioned to the side of the aperture 20 so as to substantially not obstruct the aperture. In this regard, it will be noted that the guide surfaces 62, 64 and 66, 68 extend transversely with respect to the axis of the tube 16 to allow the door 22 to move transversely in the final stage of movement to the fully opened position shown in FIGS. 6 and 7. In other words, the guide slots extend transversely to one side of the aperture 20 to permit the door to move out of the way of the aperture in the fully opened position.

Upon removal of a refueling nozzle the door reverses the sequence of movement; and, as the door approaches the closed position, as represented by the dashed line in FIG. 1, the door is again parallel to the bulkhead and closes the seal 26 against the seating surface 36 in a linear translation movement which prevents scrubbing and/or undue compression of one side of the seal as would be the case if the door were pivoted about a simple hinge. Thus, the configuration of the guide surfaces and movement of the followers of the present invention provide for assured uniform seating and allows seal to wipe orifice surface 36 and compression of the seal on the seating surface; and, by eliminating scrubbing of the seal on the seating surface during opening and closing provides for improved service life of the seal.

Although the invention has hereinabove been described with respect to the illustrated embodiments, it will be understood that the invention is capable of modification and variation and is limited only by the following claims.

What is claimed is:

1. A refueling closure assembly for use in a capless filler tube with a nozzle receiving aperture for a fuel tank comprising:
   (a) support structure with portions thereof defining a first and second set of spaced guide surfaces;
   (b) a closure door with a seating portion configured for closing on said aperture and with a first and a second set of spaced follower surfaces engaging said first and second set of guide surfaces, wherein said first and second set of guide surfaces are configured such that, upon progressive insertion of a refueling nozzle through the nozzle aperture said door is caused to first move in translation away from said aperture then rotate and move to an open position substantially not obstructing said aperture; and,
   (c) spring structure operative, upon insertion of said assembly in said filler tube, for biasing said door in a direction toward closing on said aperture.

2. The closure assembly defined in claim 1, wherein said support structure includes a bracket having a generally U-shaped configuration.

3. The closure assembly defined in claim 1, wherein said follower surfaces are formed by pins or axles disposed on said door.

4. The closure assembly defined in claim 1, wherein said first and second set of follower surfaces comprise trunnions on said door.

5. The closure assembly defined in claim 1, wherein said door includes an annular flexible seal for sealing about said aperture.

6. The closure assembly defined in claim 1, wherein said door includes a portion extending through said aperture when said door is closed against said aperture.

7. The assembly defined in claim 1, wherein said followers include pins or axles with end caps.

8. The assembly defined in claim 1, wherein said closure door includes a pair of spaced brackets closely interfifting said housing structure.

9. A method of making a closure assembly for use in a capless filler tube with a nozzle aperture comprising:
   (a) forming a support structure with portions thereof defining a first and a second set of guide surfaces, said first and second set disposed in spaced arrangement;
   (b) forming a closure door with a portion configured for closing on said aperture and forming thereon a first set of oppositely directed trunnions and forming thereon a second set of oppositely directed trunnions spaced from said first set;
   (c) engaging said first set of trunnions with said first set of tracks and engaging said second set of trunnions with said second set of tracks;

(d) configuring said first and second set of tracks and, upon progressive insertion of a nozzle through the nozzle aperture, moving said door first in translation away from said aperture, then in rotation and moving said door to a fully open position and substantially not obstructing nozzle insertion; and, (e) biasing said door upon insertion in said filler tube for movement in a direction towards said aperture.

10. The method defined in claim 9, wherein said step of forming a closure door includes disposing thereon a flexible annular seal.

11. The method defined in claim 9, wherein said step of forming a support structure includes forming a first and second set of spaced guide slots on tracks.

12. The method defined in claim 9, wherein upon insertion of said assembly in said filler tube, a portion of said door extends through said aperture when said door is closed thereagainst.

13. A method of making a capless closure for a fuel tank filler tube with a nozzle receiving aperture comprising:

(a) disposing a support structure on the downstream side of the aperture and forming a first and second spaced set of guide surfaces in said support structure;

(b) disposing a closure door on said support structure for closing said aperture and engaging said first and second set of guide surfaces with follower surfaces on the door and configuring said guide surfaces such that, upon insertion of a nozzle in said aperture, the door moves initially in translation and subsequently in rotation away from said orifice to a position substantially not obstructing the aperture and reverses the sequence upon nozzle removal.

14. The method defined in claim 13, wherein said step of forming guide tracks includes forming a first and second set of oppositely disposed tracks.

15. The method defined in claim 13, wherein said step of engaging said tracks with trunnions includes disposing a pair of pins or axles on said door.

16. The method defined in claim 13, wherein said step of disposing a door includes disposing a door with an annular flexible seal for sealing about the aperture.

17. The method defined in claim 13, wherein said step of forming guide surfaces includes forming slots in said support structure.

18. The method defined in claim 13, wherein said step of disposing a door includes biasing the door in a direction toward said orifice.

19. The method defined in claim 13, wherein said step of engaging said guide with said follower surfaces includes disposing oppositely extending brackets on the door.

20. The method defined in claim 19, wherein said disposing trunnion includes integrally forming the brackets with the door.

* * * * *